(12) United States Patent
Liang et al.

(10) Patent No.: US 10,339,209 B2
(45) Date of Patent: Jul. 2, 2019

(54) WEBPAGE DISPLAY METHOD AND DEVICE

(71) Applicant: UC Mobile Co., Ltd., Beijing (CN)

(72) Inventors: Jie Liang, Beijing (CN); Jinhe Zeng, Beijing (CN)

(73) Assignee: UC Mobile Co., Ltd., Beijing (CN)

( * ) Notice: Subject to any disclaimer, the term of this patent is extended or adjusted under 35 U.S.C. 154(b) by 295 days.

(21) Appl. No.: 15/167,819

(22) Filed: May 27, 2016

(65) Prior Publication Data

US 2016/0275054 A1  Sep. 22, 2016

Related U.S. Application Data

(63) Continuation of application No. PCT/CN2014/078715, filed on May 28, 2014.

(30) Foreign Application Priority Data

Nov. 29, 2013 (CN) .......................... 2013 1 0629615

(51) Int. Cl.
*G06F 17/22* (2006.01)
*G06F 17/21* (2006.01)
*G06F 17/27* (2006.01)
*G06F 16/958* (2019.01)

(52) U.S. Cl.
CPC ........ *G06F 17/2247* (2013.01); *G06F 16/986* (2019.01); *G06F 17/212* (2013.01); *G06F 17/272* (2013.01)

(58) Field of Classification Search
None
See application file for complete search history.

(56) References Cited

U.S. PATENT DOCUMENTS

| 2002/0065848 | A1* | 5/2002 | Walker | G06F 17/24 715/205 |
| 2006/0259860 | A1* | 11/2006 | Kobashi | G06F 17/212 715/209 |
| 2008/0281834 | A1* | 11/2008 | Wu | G06F 17/30861 |

(Continued)

FOREIGN PATENT DOCUMENTS

| CN | 101499099 A | 8/2009 |
| CN | 101853293 A | 10/2010 |

(Continued)

OTHER PUBLICATIONS

International Written Opinion for PCT/CN2014/078715, dated Sep. 3, 2014.

(Continued)

*Primary Examiner* — Howard Cortes
(74) *Attorney, Agent, or Firm* — Sheppard Mullin Richter & Hampton LLP (57) ABSTRACT

A webpage display method includes: acquiring source code of a webpage; parsing the source code to form tree-shaped nodes; composing the tree-shaped nodes; determining a primary container according to the composed tree-shaped nodes; determining at least one secondary container in the primary container; adjusting the area of the secondary container; and drawing the adjusted secondary container and displaying the elements of the adjusted secondary containers on the screen.

15 Claims, 6 Drawing Sheets

(56) References Cited

U.S. PATENT DOCUMENTS

| | | | |
|---|---|---|---|
| 2011/0119571 A1* | 5/2011 | Decker | G06F 17/30902 715/205 |
| 2011/0289436 A1* | 11/2011 | Choi | G06F 17/30905 715/760 |
| 2012/0110437 A1 | 5/2012 | Pan | |
| 2012/0131429 A1* | 5/2012 | Day | G06F 17/30905 715/205 |
| 2012/0162266 A1* | 6/2012 | Douglas | G06F 3/0481 345/677 |
| 2013/0080910 A1* | 3/2013 | Bingell | G06F 3/048 715/744 |
| 2013/0212487 A1* | 8/2013 | Cote | G06F 9/451 715/745 |
| 2014/0002504 A1* | 1/2014 | Farmer | G09G 5/00 345/660 |
| 2014/0040711 A1* | 2/2014 | Brownlow | G06F 17/212 715/202 |
| 2014/0063070 A1* | 3/2014 | Leventhal | G06F 3/04812 345/660 |
| 2014/0365873 A1* | 12/2014 | Willis | G06F 17/212 715/243 |
| 2015/0082181 A1* | 3/2015 | Ames | G06F 3/04815 715/738 |
| 2015/0234798 A1* | 8/2015 | Mocanu | G06F 17/2247 715/236 |

FOREIGN PATENT DOCUMENTS

| | | |
|---|---|---|
| CN | 101951405 A | 1/2011 |
| CN | 102779167 A | 11/2012 |
| CN | 103064920 A | 4/2013 |
| CN | 103605783 A | 2/2014 |

OTHER PUBLICATIONS

International Preliminary Report on Patentability for PCT/CN2014/078715, dated May 31, 2016, 6 pages.

First Notice issued by China State Intellectual Property Office, dated Mar. 9, 2016 for Chinese Patent Application No. 201310629615.6 with search report.

Second Notice issued by China State Intellectual Property Office, dated Oct. 10, 2016 for Chinese Patent Application No. 201310629615.6.

Third Notice issued by China State Intellectual Property Office, dated Apr. 26, 2017 for Chinese Patent Application No. 201310629615.6 with search report.

"CSS Flexible Box Layout Module", W3C Candidate Recommendation, Sep. 18, 2012 <https://www.w3.org/TR/2012/CR-css3-flexbox-20120918/>.

International Application No. PCT/CN2014/078715, International Search Report and Written Opinion dated Jun. 4, 2015.

* cited by examiner

WEBPAGE DISPLAY METHOD AND DEVICE

CROSS-REFERENCE TO RELATED APPLICATIONS

This application is a continuation application of International Application No. PCT/CN2014/078715, filed May 28, 2014, which is based upon and claims priority to Chinese Patent Application No. 201310629615.6, filed Nov. 29, 2013. The entire contents of the above referenced applications are incorporated herein by reference.

TECHNICAL FIELD

The present invention relates to the field of mobile communication technologies, and more particularly, to a webpage display method and device.

RELATED ART

When a user uses a portable terminal, for example, a mobile phone, a PAD or the like, to browse webpages, as the webpages are designed according to the size of a screen of a desktop computer and the size of the screen of the portable terminal is smaller, if an original webpage is displayed on the screen of the portable mobile terminal, the height and the width of the webpage will be beyond the screen of the portable terminal, and when the user browses, the user needs to adjust the content of the webpage while browsing; if the webpage is directly and fully scaled down to the same size as that of the screen in the portable terminal for display, the displayed content of the webpage is too small, and the user cannot clearly browse the content of the webpage, significantly affecting user experience.

With respect to the aforementioned problem, at present, a webpage display method widely used in a portable terminal is: improving the readability of a webpage in the portable terminal by enlarging fonts of some content. A specific implementation method is as follows: when the content of the webpage is composed, it is guaranteed that the overall layout of the webpage is unchanged, and the text of the important content of the webpage is scaled up to make words of the important content achieve a readable effect. When the user needs to carefully read some content, the text content is scaled up again in an interactive way. Although the method optimizes the text and can guarantee the integrity of the overall layout of the webpage, the scale-up of the text results in deformation of composition of some areas and overflow hiding of the words, which damages the composition of local details.

Thus, how to provide a webpage display method that can guarantee the readability and can also retain the detail composition of the webpage becomes a problem to be urgently addressed in this field.

SUMMARY OF THE INVENTION

Embodiments of the present application provide a webpage display method and device, which can guarantee the readability of a webpage in a portable terminal and can also retain the detail composition of the webpage, improving user experience.

In the embodiments of the present application, a webpage display method is disclosed, the method including: acquiring source code of a webpage to be displayed; parsing the source code to form tree-shaped nodes; composing the tree-shaped nodes according to style specifications of the source code; locating a primary container according to the composed tree-shaped nodes; locating at least one secondary container in the primary container, wherein each of the secondary containers contains some of the elements of the webpage to be displayed; adjusting the area of the secondary container; and drawing the adjusted secondary container, and displaying the elements of the webpage to be displayed which are contained in the adjusted secondary container on a screen.

In the embodiments of the present application, a webpage display device is further disclosed, the device including: an acquisition unit configured to acquire source code of a webpage to be displayed; a parsing unit configured to parse the source code acquired by the acquisition unit to form tree-shaped nodes; a composing unit configured to compose the tree-shaped nodes formed by the parsing unit through parsing according to style specifications of the source code; a first locating unit configured to locate/determine a primary container according to the tree-shaped nodes composed by the composing unit; a second locating unit configured to locate/determine at least one secondary container in the primary container, wherein each of the secondary containers contains some of the elements of the webpage to be displayed; a first adjustment unit configured to adjust the area of the secondary container located by the second locating unit; and a drawing unit configured to draw the secondary container adjusted by the first adjustment unit, and display the elements of the webpage to be displayed which are contained in the adjusted secondary container on a screen.

In the embodiments of the present application, a webpage display method is disclosed, the method including: composing tree-shaped nodes according to style specifications of source code of a webpage to be displayed, wherein the tree-shaped nodes are formed after the source code is parsed; locating a primary container and at least one secondary container in the primary container according to the composed tree-shaped nodes, wherein each secondary container contains some of the elements in the webpage to be displayed; and by adjusting the area of the at least one secondary container, changing the elements displayed on a screen.

In the embodiments of the present application, a webpage display device is further disclosed, the device including: a processor; the processor being configured to: compose tree-shaped nodes according to style specifications of source code of a webpage to be displayed, wherein the tree-shaped nodes are formed after the source code is parsed; locate/determine a primary container and at least one secondary container in the primary container according to the composed tree-shaped nodes, wherein each secondary container contains some in the elements of the webpage to be displayed; and by adjusting the area of the at least one secondary container, change the elements displayed on a screen.

It can be known form the aforementioned technical solutions that, in the webpage display method and device according to the embodiments of the present application, source code of a webpage to be displayed is parsed to form tree-shaped nodes, and a primary container and secondary containers of the tree-shaped nodes are located, wherein each of the secondary containers contains some of the elements of the webpage to be displayed. Then the area of each of the secondary containers is adjusted, the adjusted secondary container is drawn, and elements of the webpage to be displayed which are contained in the secondary container are displayed on a screen. Compared with the prior art, in the embodiments of the present application, a webpage to be displayed is modularized, when some of the elements of the webpage are adjusted, actually an adjusted object is a secondary container that contains the elements, and thus, scale-up of the elements will not damage the detail composition of the secondary container. At the same time, as various secondary containers are mutually independent modules, when the area of a certain secondary container is adjusted, the composition of other secondary containers will not be influenced. It can be seen that the webpage display method and device according to the embodiments of the present application not only can guarantee the readability of a webpage, but also, on this basis, can retain the detail composition of the webpage, improving user experience.

BRIEF DESCRIPTION OF THE DRAWINGS

To illustrate the technical solutions according to the embodiments of the present application or in the prior art more clearly, the accompanying drawings for describing the embodiments or in the prior art are introduced briefly in the following. Apparently, persons of ordinary skill in the art can obtain other drawings according to the accompanying drawings without paying any creative efforts.

DETAILED DESCRIPTION

To make persons skilled in the art better understand the technical solutions in the embodiments of the present application and make the aforementioned objectives, features and advantages of the embodiments of the present application more comprehensible, the technical solutions in the embodiments of the present application are further described below in detail with reference to the accompanying drawings.

Figure 1:
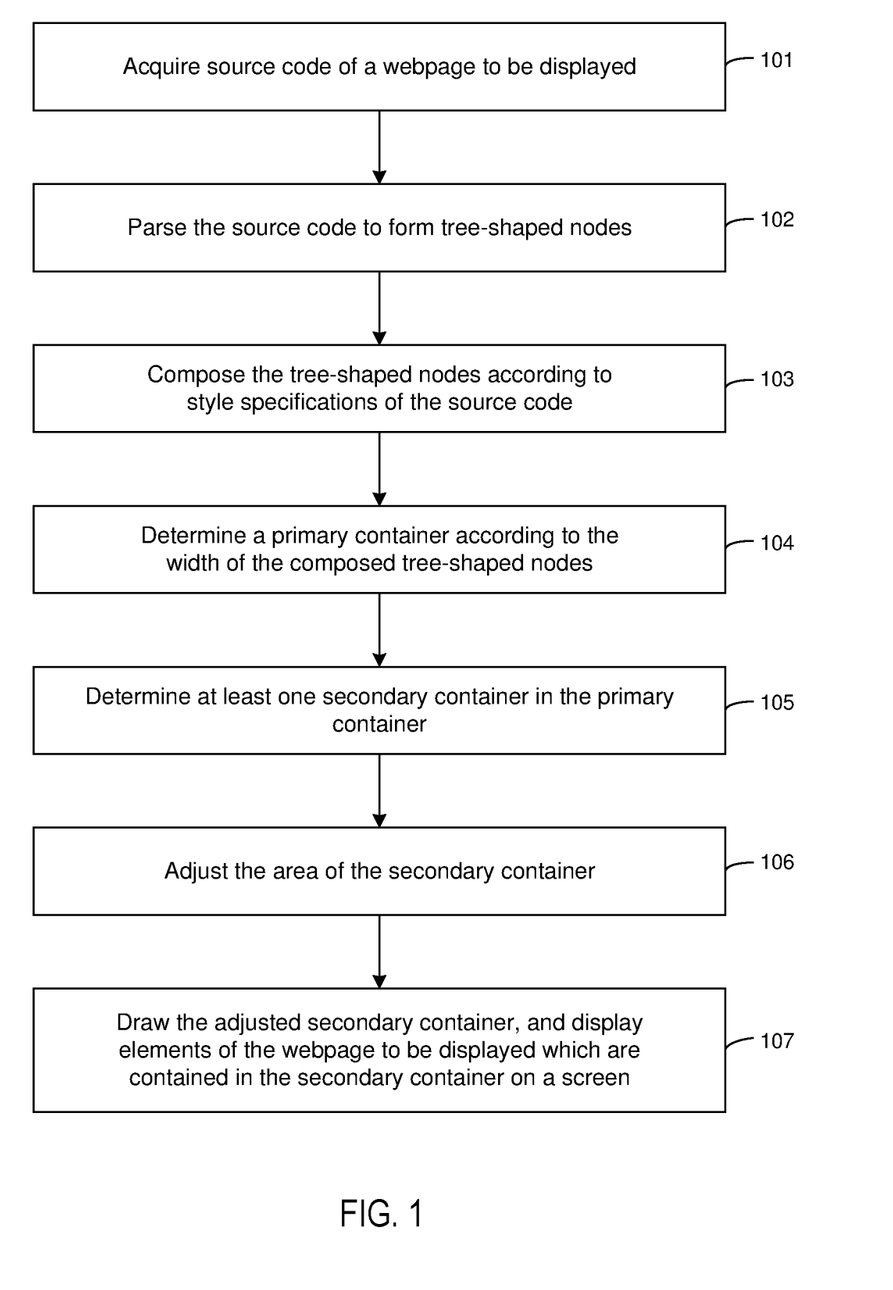
FIG. 1 is a flow chart of a webpage display method according to an embodiment of the present application.

Referring to FIG. 1, FIG. 1 is a flow chart of a webpage display method according to an embodiment of the present application.

The method includes:

Step 101: Source code of a webpage to be displayed is acquired.

The webpage to be displayed refers to a webpage to be displayed after a user triggers the webpage in a portable terminal, which may be any webpage, for example, Netease, Sohu or Baidu and the like. The source code is computer description language, which organizes and composes elements such as pictures, video, music and words on a webpage to be displayed by means of assembly, and displays the elements in the form of a webpage after they are translated by a browser. The source code may be written in a Hypertext Markup Language (HTML).

Step 102: The source code is parsed to form tree-shaped nodes.

An existing webpage is generally written in an HTML language, and the content of the existing webpage follows an HTML specification or a WAP specification; in order to make the structure of the source code of the webpage to be displayed clearer to make it easier to modularize the webpage to be displayed according to webpage elements, the source code of the webpage to be displayed may be parsed to identify tree-shaped nodes therein.

The tree-shaped nodes may be any known or upcoming tree-shaped node. For example, in a preferred embodiment of the present application, the webpage is standardized according to a Document Object Model (DOM), the source code for describing the webpage to be displayed is parsed, and DOM nodes are identified. Certainly, the above is merely an example provided in the present application, and the present application is not limited thereto.

Step 103: The tree-shaped nodes are composed according to style specifications of the source code.

The tree-shaped nodes map a page of the webpage to be displayed as a document that is made up of hierarchy nodes, wherein the nodes are divided into several levels, and the nodes in each level contain certain webpage elements; however, in order to accurately display the composition structure of the webpage to be displayed to facilitate modularization of the content of the webpage to be displayed, the tree-shaped nodes are composed according to style specifications of the source code.

The composing the tree-shaped nodes according to style specifications of the source code may be that the tree-shaped nodes are composed according to Cascading Style Sheets (CSS) or an HTML style, and may also be that the tree-shaped nodes are composed according to other standards, which is not limited in the present application.

In addition, the operation of composing the tree-shaped nodes is a technology well-known to persons skilled in the art, which is not repeated herein in the present application.

Step 104: A primary container is located (i.e., determined) according to the composed tree-shaped nodes.

The primary container is a module that contains multiple smaller modules on a webpage. For example, a full page of a webpage can be regarded as a primary container. In the tree-shaped nodes, a node that contains multiple secondary nodes can be located/determined as a primary container.

In the webpage display method according to the embodiments of the present application, whether a node is the primary container is located through the width of the node after composition; the width of the node refers to the number of pixels occupied horizontally when the tree-shaped node is displayed in a pixel device according to the original proportion, and in the present application, the width of the node is determined according to the number of the webpage elements that are contained in the node.

Step 105: At least one secondary container in the primary container is located.

Each primary container may contain one or more secondary containers. The number of the secondary containers that are contained in the primary container is determined according to the structure of the webpage to be displayed. For example, the structure of the home page of Baidu Search is relatively simple, and thus it can be located as one secondary container; in terms of the home page of 360 Browser, the home page of 360 Browser can be regarded as a primary container. During location, a root node is located as the primary container, the right side of the page is regarded as a module, and the left side is regarded as a module; and thus when the node is located, the primary container contains two secondary containers. In addition, when a primary container contains multiple secondary containers, the secondary containers are mutually independent; the layout of the elements in other secondary containers is not impacted when any of the secondary containers is adjusted.

Generally, component elements of a webpage can be divided into two broad categories: body elements and ancillary elements for location. The body elements are, for example, texts, pictures, blocks with a background or a border, forms, input boxes, other visual elements and the like. The ancillary elements for location are, for example, invisible blocks (for example, performance of HTML tags <div> in a default style). When the tree-shaped nodes are located, an ancillary element that contains a large portion of content can be located as a primary container, other ancillary elements can be located as secondary containers in the primary container, and major elements are filled in each secondary container.

Step 106: The area of the secondary container is adjusted.

A scaling factor is calculated in accordance with the importance of the secondary container, and according to the calculated scaling factor, the area of each secondary container is respectively adjusted; the area of the secondary container with greater importance is scaled up, while the area of the secondary container with less importance is scaled down, wherein the scale-up degree is subject to clear display on the portable terminal. The clear display refers to that, after the webpage to be displayed is displayed on the portable terminal, a user can clearly browse the content of the scaled-up secondary container without performing any operation. In addition, the importance of the secondary container can be judged according to the frequency at which a webpage element is browsed. If the webpage element is a part that is often browsed by a user during browsing of the webpage, the importance of the webpage element is high. Thus, when a secondary container is located, it is feasible to locate the part that contains webpage elements browsed at a higher frequency as a secondary container with a larger area, and the importance of the secondary container is judged through the area of the secondary container.

The adjusting the area of the secondary container refers to uniformly scaling the width and the height of the secondary container. When the secondary container is scaled, the webpage elements contained in the secondary container may also be correspondingly scaled up or scaled down. When the area of the secondary container is adjusted, comparing the areas after the adjustment and before the adjustment, the total width of the secondary container is kept unchanged.

Step 107: The adjusted secondary container is drawn, and elements of the webpage to be displayed which are contained in the adjusted secondary container are displayed on a screen.

In the webpage display method according to this embodiment, source code of a webpage to be displayed is parsed to form tree-shaped nodes, and a primary container and secondary containers of the tree-shaped nodes are located, wherein each of the secondary containers contains some of the elements of the webpage to be displayed. Then the area of each of the secondary containers is adjusted, the adjusted secondary container is drawn, and elements of the webpage to be displayed which are contained in the secondary container are displayed on a screen. Compared with the prior art, in the embodiment of the present application, a webpage to be displayed is modularized. When some of the elements of the webpage are adjusted, the real object to be adjusted is a secondary container that contains the elements. Thus, scale-up of the elements will not damage the detail composition of the secondary container. At the same time, as various secondary containers are mutually independent modules, when the area of a certain secondary container is adjusted, the composition of other secondary containers will not be impacted. It can be seen that the webpage display method and device according to the embodiment of the present application not only can guarantee the readability of a webpage, but also, on this basis, can retain the detail composition of the webpage, improving user experience.

To make persons skilled in the art understand the technical solutions of the present application more clearly, on the basis of the aforementioned embodiment, the present application also provides a flow chart of a second implementation of the webpage display method.

Figure 2:
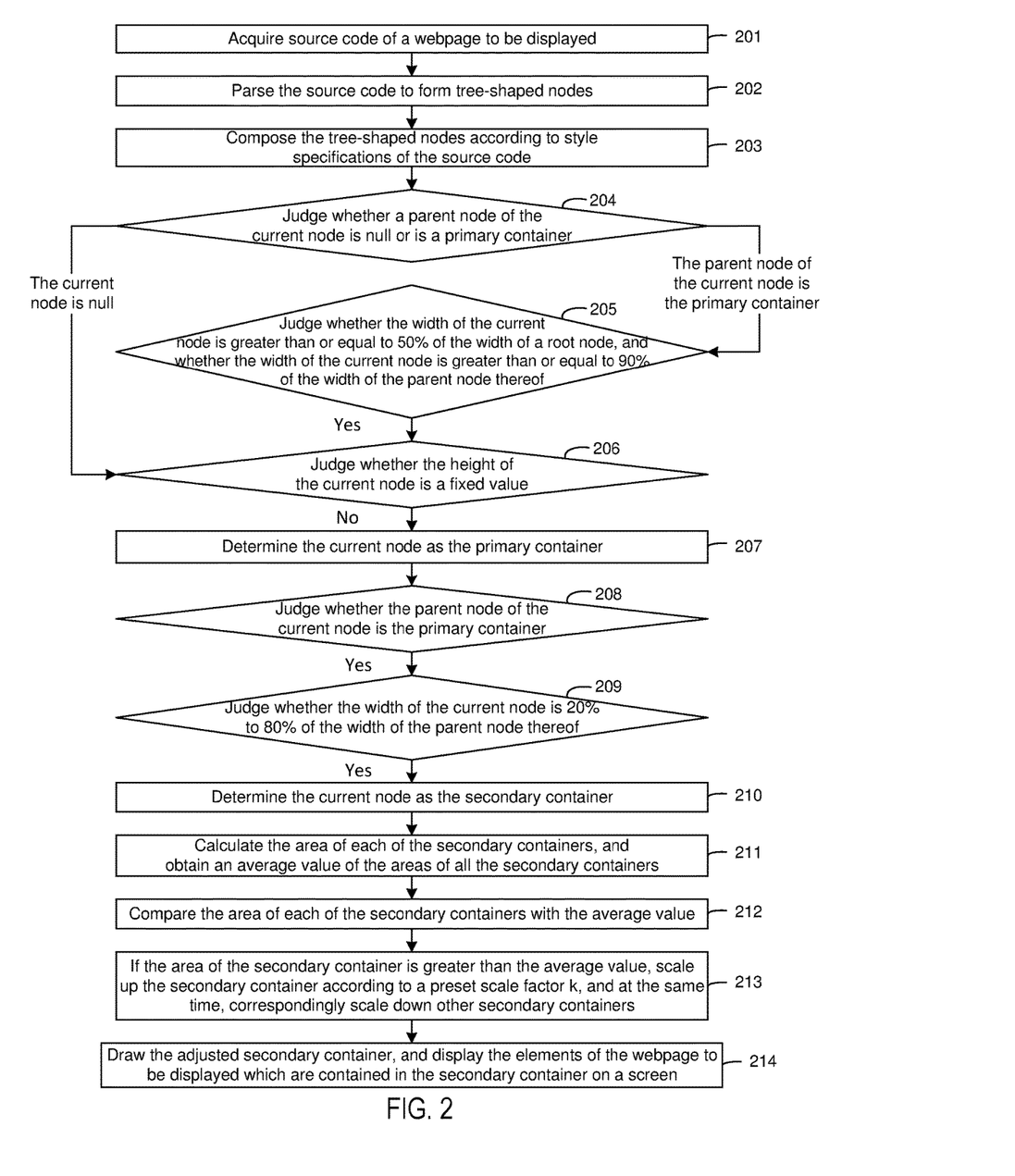
FIG. 2 is a flow chart of a second implementation of the webpage display method according to an embodiment of the present application.

Referring to FIG. 2, FIG. 2 is a flow chart of a second implementation of the webpage display method according to an embodiment of the present application.

The method includes:

Step 201: Source code of a webpage to be displayed is acquired.

Step 202: The source code is parsed to form tree-shaped nodes.

Step 203: The tree-shaped nodes are composed according to style specifications of the source code.

Step 204: Whether a parent node of the current node is null or is a primary container is judged, and if the parent node of the current node is null, step 206 is performed; if the parent node of the current node is the primary container, step 205 is performed.

The parent node of the current node is null, that is, the current node is a root node.

Step 205: Whether the width of the current node is greater than or equal to a first percentage (for example, 50%) of the width of a root node and greater than or equal to a second percentage (for example, 90%) of the width of the parent node of the current node is judged; if yes, step 206 is performed; if no, no operation is performed.

When the width of the current node is greater than or equal to 90% of the width of the parent node thereof, it indicates that the parent node of the current node is only an ancillary element for location and the webpage elements that are contained therein are all contained in the container where the current node is located.

Step 206: Whether the height of the current node is a fixed value is judged. If the height of the current node is the fixed value, no operation is performed on the current node; and if the current node is not the fixed value, step 207 is performed.

The judging whether the height of the current nodes is a fixed value may include: whether source code corresponding to the current node sets the height value of the current node as a fixed value is judged, and if the height value of the current node is set as the fixed value, it is judged that the height of the current node is the fixed value; otherwise, it is judged that the height of the current nodes may not be the fixed value. Whether a background image corresponding to the current node supports a variable height may be judged, and if the height of the background image of the current node is not variable, for example, a repeat-x image or a no-repeat image, it is judged that the height of the current node is a fixed value, and otherwise, it is judged that the height of the current nodes may not be the fixed value.

The above is merely an example provided in the present application, and in the present application, when whether the current node is variable is judged; the judgment may also be made through other factors, which are not limited in the present application.

When the width of the secondary container is adjusted to the same width as that of the screen of the portable terminal, in order to ensure that the webpage elements in the secondary container are reasonably composed, the height of the secondary container will change, thus, the primary container that contains the secondary containers will need to support the variable height.

Step 207: The current node is determined as a primary container.

Step 208: Whether the parent node of the current node is a primary container is judged. If the parent node of the current node is not the primary container, no operation is performed; and if the parent node of the current node is the primary container, step 209 is performed.

The secondary containers are nested in the primary container, and multiple secondary containers are mutually independent; thus, according to the hierarchical structure characteristics of the tree-shaped nodes, the parent node of the secondary container node is a primary container.

Step 209: Whether the width of the current node is a third percentage (for example, 20%) to a fourth percentage (for example, 80%) of the width of the parent node thereof is judged. If yes, step 210 is performed; and if no, no operation is performed.

As each primary container contains at least one secondary container, when the primary container contains one secondary container, the width of the secondary container is 80% of the width of the primary container; when the primary container contains more secondary containers, the width of each of the secondary container accounts for less than 80% of the width of the primary container; if the width of the secondary container accounts for less than 20% of the width of the primary container thereof, the area of the secondary container is too small, which makes no sense based on the technical problems to be solved in the present application. Therefore, the width of the secondary container accounts for 20% to 80% of the width of the primary container.

Step 210: The current node is determined as a secondary container.

Step 211: The area of each of the secondary containers is calculated, and an average value of the areas of all the secondary containers is obtained.

It can be known from the aforementioned embodiment that the area of the secondary container shows the importance of the webpage elements contained in the secondary container; the larger the area of the secondary container is, the greater the importance of the elements contained in the secondary container is.

When the primary container contains at least two secondary containers, the area of each secondary container may be calculated according to the importance of the secondary container, and the calculation method may be: calculating a product of the width and the height of the secondary container, and using the result of the product as the area value of the secondary container; or calculating an area value of each category of elements in the secondary container, and adding all the area values to obtain the area of the secondary container, wherein, the element categories include texts, pictures, animated video and controls, and according to the importance of each category of elements, each category of elements are preset with a weighted parameter, and the area of the elements is obtained according to the calculation of multiplying the physical area of the elements by the weighted parameter of the elements; when the primary container only contains one secondary container, it may not be necessary to compare the importance among the secondary containers, and it is feasible to directly display the webpage to be displayed.

Step 212: The area of each of the secondary containers is compared with the average value.

Step 213: If the area of the secondary container is greater than the average value, the secondary container is scaled up according to a preset scale factor k, wherein, the k is greater than 1; at the same time, other secondary containers are correspondingly scaled down to keep the total width of the secondary containers unchanged.

The preset scale factor k can be calculated according to different webpage compositions and the number and the size of the secondary container; or the scale factor of each secondary container is obtained through calculation. In order to ensure that the total width of the secondary containers is unchanged, when a secondary container of greater importance is scaled up k times according to its own preset scale factor, other secondary containers are correspondingly scaled down.

The method of calculating the preset scale factor of each secondary container includes: suppose that a visual width of a page on a screen of a portable terminal is u and the width of each secondary container is w, the value of u divided by w is the preset scale factor k of the secondary container. The algorithm may also be used as an algorithm for the scaling factor of each secondary container when any secondary container is adjusted to fit the screen display.

Step 214: The adjusted secondary container is drawn, and elements of the webpage to be displayed that are contained in the adjusted secondary container are displayed on a screen.

The drawing in the present application refers to displaying the content contained in the secondary container on a screen through combination, movement, cascading, scaling, clipping and other technical measures.

In the webpage display method according to this embodiment, the area of the secondary container is used to indicate the importance of the webpage content that is contained in the secondary container, which is convenient and simple to determine a secondary container to be displayed, avoiding a lot of operation processes, and thus the speed at which the webpage is displayed on a screen is increased, improving user experience.

When a user browses a webpage, it is unlikely that the user only browses some of the content of the webpage; when the user needs to browse some content other than the content currently displayed, the content of the webpage displayed may be switched; based on this, according to the aforementioned embodiment, the present application further provides a third implementation of the webpage display method.

Figure 3:
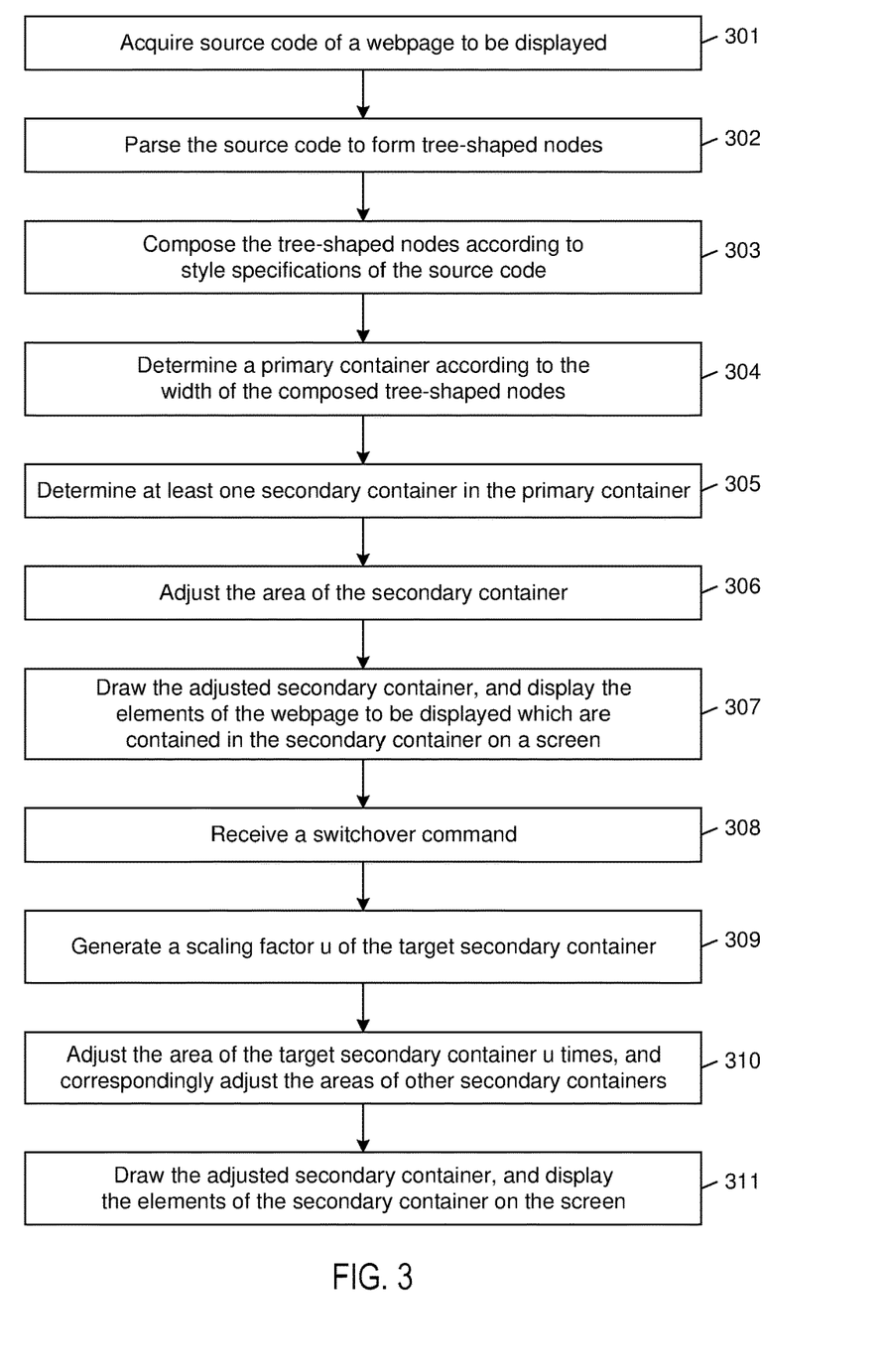
FIG. 3 is a flow chart of a third implementation of the webpage display method according to an embodiment of the present application.

Referring to FIG. 3, FIG. 3 is a flow chart of a third implementation of the webpage display method according to an embodiment of the present application.

The method further includes:

Step 301: Source code of a webpage to be displayed is acquired.

Step 302: The source code is parsed to form tree-shaped nodes.

Step 303: The tree-shaped nodes are composed according to style specifications of the source code.

Step 304: A primary container is located according to the composed tree-shaped nodes.

Step 305: At least one secondary container in the primary container is located.

Step 306: The area of the secondary container is adjusted.

Step 307: The adjusted secondary container is drawn, and elements of the webpage to be displayed which are contained in the secondary container are displayed on a screen.

Step 301 to step 307 are similar to those in the aforementioned two embodiments, which are not repeated herein in the present application.

Step 308: A switchover command is received.

It can be known form the aforementioned embodiment that, when a webpage is displayed on a screen, the content of a secondary container of the greatest importance is scaled up and displayed in a default manner, and when a user needs to browse the content of other secondary containers, the user can produce an interactive operation with a portable terminal through a gesture or a function control that is additionally provided by the portable terminal, to scale up and display the content of a target secondary container. When the portable terminal receives trigger information such as the user's gesture or the function control, the trigger signal is used as a switchover command, and the target secondary container is scaled up according to the switchover command. For example, the content of the target secondary container is double-clicked.

Step 309: A scaling factor u of the target secondary container is generated.

When a secondary container is switched, it may not be necessary to consider the importance of the webpage elements in the target secondary container, and adjustment is made only for the target secondary container and the screen of the portable terminal. Thus, the method of generating a scaling factor of the target secondary container may be: comparing the width of the screen of the portable terminal with the width of the primary container, and choosing the minimum value of the two; making multiplication calculation on the minimum value and the preset scale factor k, and dividing the result of the multiplication calculation by the width of the target secondary container, to obtain a first scaling factor u1; dividing a height value of the primary container by a height value of the target secondary container, to obtain a second scaling factor u2; and determining the minimum value in the u1 and the u2 as the scaling factor u, wherein, if u is less than 1, u is set as 1; or obtaining the preset scale factor of each secondary container through calculation according to the method of the aforementioned embodiment.

The method of generating a scaling factor u is not limited thereto, and may also be any other suitable methods, for example, a scaling factor u being generated according to a pixel value of a secondary container, which is not limited in the present application.

Step 310: The area of the target secondary container is adjusted u times, and the areas of other secondary containers are correspondingly adjusted to keep the total width of the secondary containers unchanged.

When a switchover command is triggered, the importance of the secondary containers is changed, and a target secondary container becomes a secondary container of greater importance. Thus, the area of the target secondary container needs to be scaled up before display, and in order to ensure that the total width of the adjusted secondary containers is unchanged, when the area of the target secondary container is scaled up, other secondary containers may be correspondingly scaled down; or according to the preset scale factor of each secondary container in the aforementioned embodiment, the target secondary container is scaled up according to its own preset scale factor, and the currently displayed secondary container is correspondingly scaled down.

Step 311: The adjusted secondary container is drawn, and elements of the adjusted secondary container are displayed on the screen.

For the adjusted secondary container, the area of the target secondary container as a secondary container of greater importance increases and the areas of other secondary containers are reduced, the overall layout of the webpage has changed, and after another drawing, the content of the target secondary container scaled up is clearly displayed on the screen. The method of drawing the adjusted secondary container is similar to the method of drawing the currently displayed secondary container, which is not repeated herein in the present application.

In the process of scaling up the target secondary container and scaling down other secondary containers, the process may be a traditional picture, for example, the target secondary container is scaled up while other secondary containers are scaled down, the switching process may also be completed in several steps through a timer setting, and the process may be set as an animation effect, improving the user's interactive experience.

In the webpage display method according to this embodiment, through an interactive operation between a user and a portable terminal, the content of a currently displayed secondary container is switched to the content of a target secondary container; in the switching process, the target secondary container is scaled up while the currently displayed secondary container is scaled down, which not only can guarantee the readability of the target secondary container but also can retain the detail composition of the current secondary container.

In the webpage display method according to the present application, source code of a webpage to be displayed is parsed to form tree-shaped nodes, and a primary container and secondary containers of the tree-shaped nodes are located, wherein each of the secondary containers contains some of the elements of the webpage to be displayed. Then the area of each of the secondary containers is adjusted, the adjusted secondary container is drawn, and elements of the webpage to be displayed which are contained in the secondary container are displayed on a screen. Compared with the prior art, in the embodiment of the present application, a webpage to be displayed is modularized, when some of the elements of the webpage are adjusted, actually an adjusted object is a secondary container that contains the elements, and thus, scale-up of the elements will not damage the detail composition of the secondary container. At the same time, as various secondary containers are mutually independent modules, when the area of a certain secondary container is adjusted, the composition of other secondary containers will not be influenced. It can be seen that the webpage display method and device according to the embodiment of the present application not only can guarantee the readability of a webpage, but also, on this basis, can retain the detail composition of the webpage, improving user experience.

The aforementioned preferred implementation process is further described below with reference to the preferred implementation shown in FIG. 4.

Figure 4:
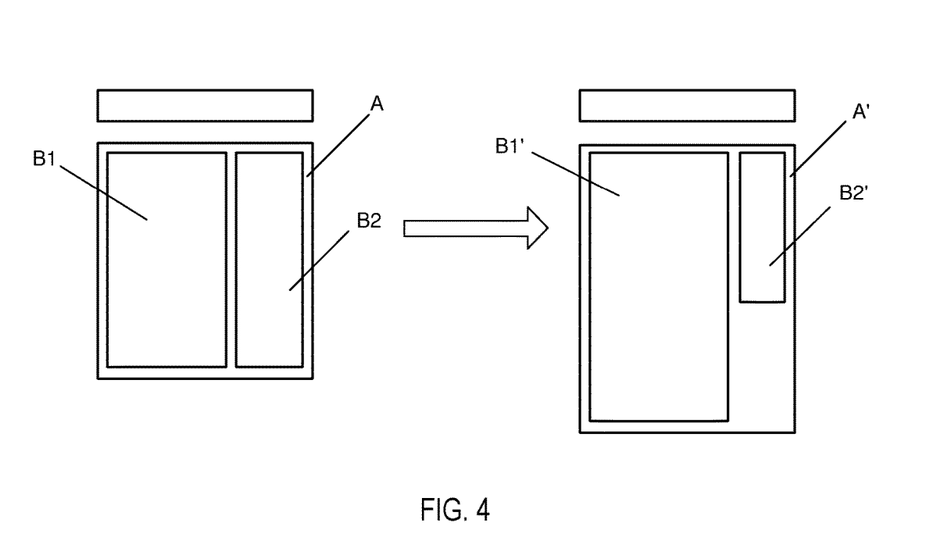
FIG. 4 is a schematic diagram of a webpage display method according to a preferred embodiment of the present application.

FIG. 4 is a schematic diagram of a webpage display method according to a preferred embodiment of the present application. As shown in FIG. 4, A is a primary container, and B1 and B2 are two secondary containers, according to the number of times that B1 and B2 are browsed, it is judged and found that the importance of B1 is greater than that of B2, thus, B1 is scaled up in its entirety while B2 is scaled down in its entirety, and corresponding to B1, the height of A is adjusted. The changing process of the webpage display is not merely limited to that the importance of the secondary container is determined according to the number of times that the secondary container is browsed, and other determinants may also be used. In addition, when a user, on a mobile terminal, can produce an interactive operation with a portable terminal through a gesture or a function control that is additionally provided by the portable terminal, hoping to scale up and display the content in the secondary container B1, at this point, the importance of the two secondary containers B1 and B2 that have been defined before will be disregarded, and the secondary container B1 is directly set as the secondary container of the greatest importance at present.

Corresponding to the aforementioned implementation method, in an embodiment of the present application, a webpage display device is further provided.

Figure 5:
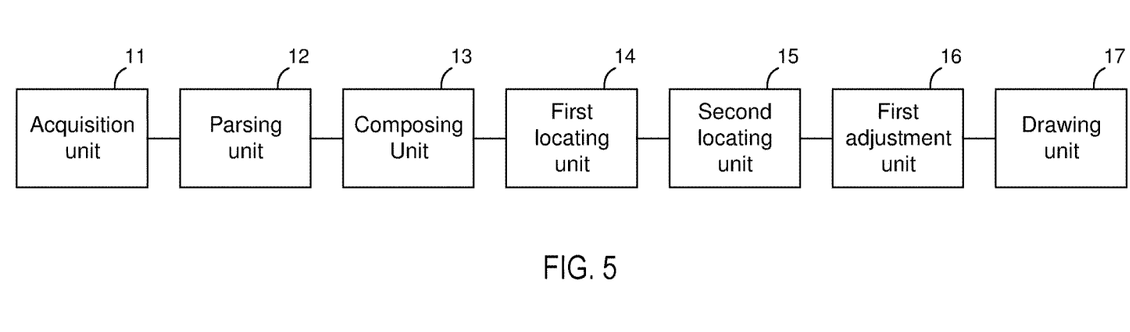
FIG. 5 is a schematic structural diagram of a webpage display device according to an embodiment of the present application.

Referring to FIG. 5, FIG. 5 is a schematic structural diagram of a webpage display device according to an embodiment of the present application.

The device includes: an acquisition unit 11, a parsing unit 12, a composing unit 13, a first locating unit 14, a second locating unit 15, a first adjustment unit 16 and a drawing unit 17, wherein the acquisition unit 11 is configured to acquire source code of a webpage to be displayed; the parsing unit 12 is configured to parse the source code acquired by the acquisition unit 11 to form tree-shaped nodes; the composing unit 13 is configured to compose the tree-shaped nodes formed by the parsing unit 12 through parsing according to style specifications of the source code; the first locating unit 14 is configured to locate a primary container according to the width after the composition by the composing unit 13; the second location 15 is configured to locate at least one secondary container in the primary container, wherein each of the secondary containers contains some of the elements of the webpage to be displayed; the first adjustment unit 16 is configured to adjust the area of the secondary container located by the second locating unit 15; and the drawing unit 17 is configured to draw the secondary container adjusted by the first adjustment 16, and display the elements of the webpage to be displayed which are contained in the adjusted secondary container on a screen.

The first locating unit includes: a first judgment unit and a second judgment unit; the second locating unit includes: a third judgment unit; and the first adjustment unit includes: a first calculation unit, a first comparison unit and a scaling unit.

Reference can be made to the corresponding implementation processes in the aforementioned method for the implementation processes of the functions and roles of each unit in the device for details, which are not repeated herein.

In the webpage display device according to the present application, source code of a webpage to be displayed is parsed to form tree-shaped nodes, and a primary container and secondary containers of the tree-shaped nodes are located, wherein each of the secondary containers contains some of the elements of the webpage to be displayed. Then the area of each of the secondary containers is adjusted, the adjusted secondary container is drawn, and elements of the webpage to be displayed which are contained in the secondary container are displayed on a screen. Compared with the prior art, in the embodiment of the present application, a webpage to be displayed is modularized, when some of the elements of the webpage are adjusted, actually an adjusted object is a secondary container that contains the elements, and thus, scale-up of the elements will not damage the detail composition of the secondary container. At the same time, as various secondary containers are mutually independent modules, when the area of a certain secondary container is adjusted, the composition of other secondary containers will not be influenced. It can be seen that the webpage display method and device according to the embodiment of the present application not only can guarantee the readability of a webpage, but also, on this basis, can retain the detail composition of the webpage, improving user experience.

Figure 6:
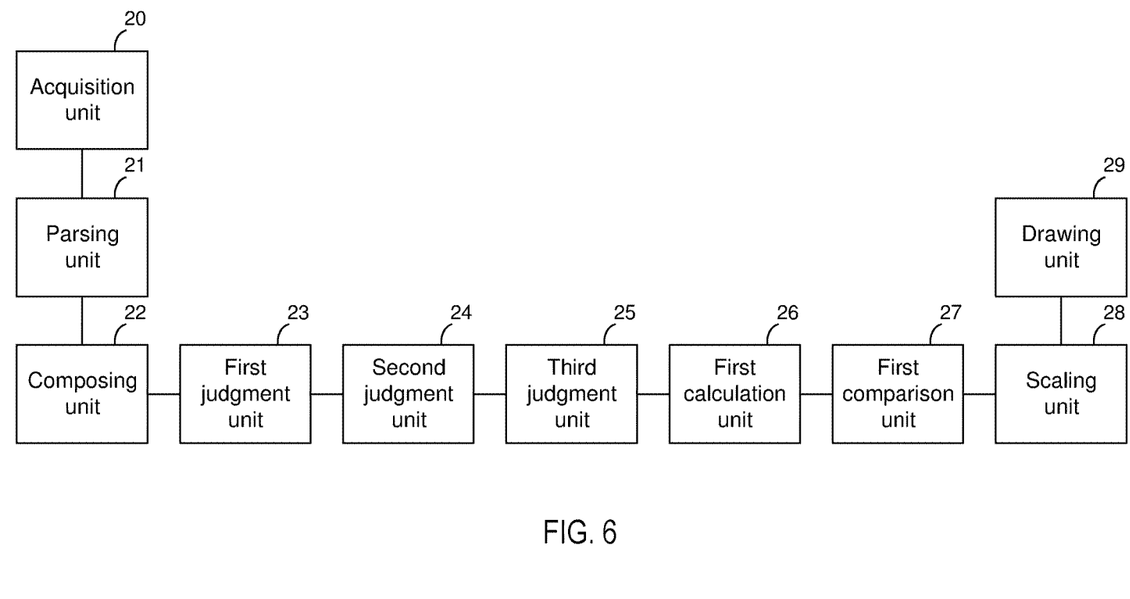
FIG. 6 is a schematic structural diagram of a second implementation of the webpage display device according to an embodiment of the present application.

Referring to FIG. 6, FIG. 6 is a schematic structural diagram of a second implementation of the webpage display device according to an embodiment of the present application.

On the basis of the aforementioned embodiment, the device of this embodiment includes: an acquisition unit 20, a parsing unit 21, a composing unit 22, a first judgment unit 23, a second judgment unit 24, a third judgment unit 25, a first calculation unit 26, a first comparison unit 27, a scaling unit 28 and a drawing unit 29, wherein the functions and connection modes of the acquisition unit 20, the parsing unit 21, the composing unit 22, and the drawing unit 29 are similar to those in the aforementioned embodiment, which are not repeated herein in the present application. The first judgment unit 23 is configured to judge whether a parent node of the current node is null or whether the parent node is the primary container; the second judgment unit 24 is configured to, when the parent node of the current node is null or is the primary container, judge whether the height of the current node is a fixed value; the third judgment unit 25 is configured to judge whether the parent node of the current node is the primary container; the first calculation unit 26 is configured to calculate the area of each of the secondary containers, and obtain an average value of the areas of all the secondary containers; the first comparison unit 27 is configured to compare the area of each of the secondary containers obtained by the first calculation unit 26 through calculation with the average value; and the scaling unit 28 is configured to, when the area of the secondary container is greater than the average value, scale up the secondary container according to a preset scale factor k, wherein, the k is greater than 1; at the same time, correspondingly scale down other secondary containers to keep the total width of the secondary containers unchanged.

On the basis of the aforementioned embodiment, in this embodiment, the first locating unit is configured to, when the height of the current node is not the fixed value, determine the current node as a primary container if the parent node is null; if the parent node of the current node is the primary container, when the width of the current node is greater than or equal to 50% of the width of a root node and greater than or equal to 90% of the width of the parent node, determine the current node as the primary container; and the second locating unit is configured to, when the parent node of the current node obtained by the third judgment unit through judgment is the primary container, if the width of the current node is 20% to 80% of the width of the parent node thereof, determine the current node as the secondary container.

Reference can be made to the corresponding implementation processes in the aforementioned method for the implementation processes of the functions and roles of each unit in the device for details, which are not repeated herein.

In the webpage display device according to this embodiment, the area of the secondary container is used to indicate the importance of the webpage content that is contained in the secondary container, which is convenient and simple to determine a secondary container to be displayed, avoiding a lot of operation processes, and thus the speed at which the webpage is displayed on a screen is increased, improving user experience.

In order to make it convenient for a user to switch the displayed content, on the basis of the aforementioned embodiment, in an embodiment of the present application, a third webpage display device is further provided.

Figure 7:
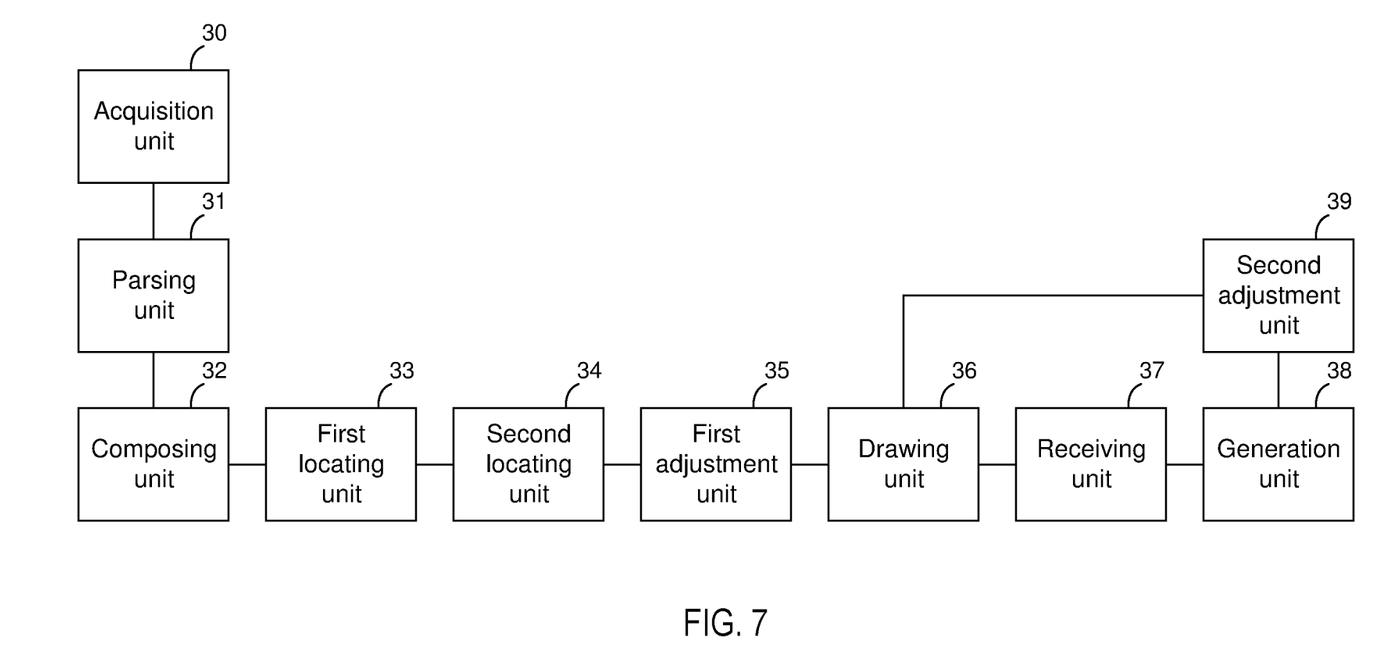
FIG. 7 is a schematic structural diagram of a third implementation of the webpage display device according to an embodiment of the present application.

Referring to FIG. 7, FIG. 7 is a schematic structural diagram of a third implementation of the webpage display device according to an embodiment of the present application.

The device includes: an acquisition unit 30, a parsing unit 31, a composing unit 32, a first locating unit 33, a second locating unit 34, a first adjustment unit 35, a drawing unit 36, a receiving unit 37, a generation unit 38 and a second adjustment unit 39, wherein the functions, roles and connection relationships of the acquisition unit 30, the parsing unit 31, the composing unit 32, the first locating unit 33, the second locating unit 34, the first adjustment unit 35 and the drawing unit 36 are similar to those in the aforementioned embodiment, which are not repeated herein in the present application. The receiving unit 37 is configured to receive a switchover command to scale up and display the content of the target secondary container; the generation unit 38 is configured to generate a scaling factor u of the target secondary container; the second adjustment unit 39 is configured to, after the generation unit generates the scaling factor u, adjust the area of the target secondary container u times, and correspondingly adjust the areas of other secondary containers to keep the total width of the secondary containers unchanged.

On the basis of the aforementioned embodiment, in this embodiment, the drawing unit is further configured to draw the secondary container adjusted by the second adjustment unit, and display the elements of the secondary container on a screen.

The generation unit includes: a second comparison unit, a second calculation unit and a determination unit; the second comparison unit is configured to compare the width of the screen with the primary container, and choose the minimum value of the two; the second calculation unit is configured to make multiplication calculation on the minimum value and the preset scale factor k, and then divide the result of the multiplication calculation by the width of the target secondary container, to obtain a first scaling factor u1; and divide a height value of the primary container by a height value of the target secondary container, to obtain a second scaling factor u2; and the determination unit is configured to determine the minimum value in the u1 and the u2 obtained by the second calculation unit through calculation as the scaling factor u.

Reference can be made to the corresponding implementation processes in the aforementioned method for the implementation processes of the functions and roles of each unit in the device for details, which are not repeated herein.

In the webpage display device according to this embodiment, through an interactive operation between a user and a portable terminal, the content of a currently displayed secondary container is switched to the content of a target secondary container; in the switching process, the target secondary container is scaled up while the currently displayed secondary container is scaled down, which not only can guarantee the readability of the target secondary container but also can retain the detail composition of the current secondary container.

To sum up, in the webpage display method and device according to the present application, source code of a webpage to be displayed is parsed to form tree-shaped nodes, and a primary container and secondary containers of the tree-shaped nodes are located, wherein each of the secondary containers contains some of the elements of the webpage to be displayed. Then the area of each of the secondary containers is adjusted, the adjusted secondary container is drawn, and elements of the webpage to be displayed which are contained in the secondary container are displayed on a screen. Compared with the prior art, in the embodiments of the present application, a webpage to be displayed is modularized, when some of the elements of the webpage are adjusted, actually an adjusted object is a secondary container that contains the elements, and thus, scale-up of the elements will not damage the detail composition of the secondary container. At the same time, as various secondary containers are mutually independent modules, when the area of a certain secondary container is adjusted, the composition of other secondary containers will not be influenced. It can be seen that the webpage display method and device according to the embodiments of the present application not only can guarantee the readability of a webpage, but also, on this basis, can retain the detail composition of the webpage, improving user experience.

The present invention can be described in a general context of computer executable instructions executed by a computer, for example, program modules. Generally, the program modules include routines, programs, objects, components, data structures and so on which execute particular tasks or implement particular abstract data types. The present invention may also be practiced in distributed computing environments, and in the distributed computing environments, tasks are executed by remote processing devices connected via a communication network. In the distributed computing environments, the program modules may be located in both local and remote computer storage mediums that include storage devices.

The relational terms such as first and second are merely used to distinguish one entity or operation from another entity or operation, but may not necessarily require or imply that any such an actual relation or order exists between the entities or operations. Moreover, terms "comprise", "include" or any other variations thereof are intended to cover non-exclusive inclusion, so that processes, methods, articles or devices that include a series of elements not only include those elements, but also include other elements not explicitly listed, or further include elements inherent in the processes, methods, articles or devices. Without more restrictions, an element defined by the wording of "including a . . . " does not preclude the further inclusion of other identical elements in the processes, methods, products or devices that include this element.

The above are merely specific implementations of the present invention, and it should be noted that persons of ordinary skill in the art, without departing from the principles of the present invention, can further make some improvements and modifications, and these improvements and modifications should also be regarded as the protection scope of the present invention.

The invention claimed is:

1. A webpage display method, the method comprising:
acquiring source code of a webpage to be displayed;
parsing the source code to form tree-shaped nodes;
composing the tree-shaped nodes according to style specifications of the source code;
determining at least a primary container according to the composed tree-shaped nodes, wherein the determining a primary container according to the composed tree-shaped nodes comprises:
judging whether a parent node of the current node is the primary container;

upon judging that the parent node of the current node is the primary container, judging whether the width of the current node is greater than or equal to a first percentage of the width of a root node and greater than or equal to a second percentage of the width of the parent node of the current node;

upon judging that the width of the current node is greater than or equal to the first percentage of the width of the root node and greater than or equal to the second percentage of the width of the parent node of the current node, judging whether the height of the current node is a fixed value; and upon judging that the height of the current node is not the fixed value, determining the current node as the primary container;

determining a plurality of secondary containers in the primary container, wherein each of the secondary containers contains some of elements of the webpage to be displayed;

determining an area of each of the secondary containers in the primary container and a threshold value associated with areas of the secondary containers;

adjusting the area of one or more of the secondary containers that is greater than the threshold value to be scaled up and the area of other one or more of the secondary containers to be scaled down; and displaying the elements of the webpage to be displayed which are contained in the adjusted secondary containers on a screen of a terminal.

2. The method according to claim 1, wherein the threshold value is an average value of the areas of the plurality of secondary containers, and the adjusting the areas of the secondary containers comprises:

comparing the area of each of the plurality of secondary containers with the average value; and with respect to the area of at least one of the plurality of secondary containers that is greater than the average value, scaling up the area of the at least one of the plurality of secondary containers according to a preset scale factor k, wherein, the k is greater than 1, and correspondingly scaling down the area of other one or more of the plurality of secondary containers to keep the total width of the plurality of secondary containers unchanged.

3. The method according to claim 1, wherein the method further comprises:

receiving a switchover command to scale up and display content of a target secondary container of the plurality of secondary containers;

generating a scaling factor u of the target secondary container;

adjusting the area of the target secondary container u times, and correspondingly adjusting the area of one or more other secondary containers of the plurality of secondary containers to keep the total width of the plurality of secondary containers unchanged; and displaying the elements of the adjusted secondary containers on the screen of the terminal.

4. The method according to claim 3, wherein the generating a scaling factor of the target secondary container comprises:

comparing the width of the screen of the terminal with the width of the primary container, and choosing the minimum value of the two;

multiplying the minimum value with the preset scale factor k, and then dividing the result of the multiplication calculation by the width of the target secondary container, to obtain a first scaling factor u1; and dividing a height value of the primary container by a height value of the target secondary container, to obtain a second scaling factor u2; and determining the minimum value in the u1 and the u2 as the scaling factor u.

5. A webpage display device, the device comprising:
one or more processors; and
memory storing instructions, when executed by the one or more processors, configured to cause the one or more processors to:

acquire source code of a webpage to be displayed;
parse the source code to form tree-shaped nodes;
compose the tree-shaped nodes according to style specifications of the source code;
locate at least a primary container according to the tree-shaped nodes, wherein the determining a primary container according to the composed tree-shaped nodes comprises:

judging whether a parent node of the current node is the primary container;

upon judging that the parent node of the current node is the primary container, judging whether the width of the current node is greater than or equal to a first percentage of the width of a root node and greater than or equal to a second percentage of the width of the parent node of the current node;

upon judging that the width of the current node is greater than or equal to the first percentage of the width of the root node and greater than or equal to the second percentage of the width of the parent node of the current node, judging whether the height of the current node is a fixed value; and upon judging that the height of the current node is not the fixed value, determining the current node as the primary container;

locate a plurality of secondary containers in the primary container, wherein each of the secondary containers contains some of elements of the webpage to be displayed;

determine an area of each of the secondary containers in the primary container and a threshold value associated with areas of the secondary containers;

adjust the area of one or more of the secondary containers that is greater than the threshold value to be scaled up and the area of other one or more of the secondary containers to be scaled down; and display the elements of the webpage to be displayed which are contained in the adjusted secondary containers on a screen of a terminal.

6. The device according to claim 5, wherein the threshold value is an average value of the areas of the plurality of secondary containers, and the instructions are further configured to cause the one or more processors to:

compare the area of each of the plurality of secondary containers with the average value; and with respect to the area of at least one of the plurality of secondary containers that is greater than the average value, scale up the area of the at least one of the secondary containers according to a preset scale factor k, wherein, the k is greater than 1, and correspondingly scale the area of other one or more of the plurality of secondary containers to keep the total width of the plurality of secondary containers unchanged.

7. The device according to claim 5, wherein the instructions are further configured to cause the one or more processors to:

receive a switchover command to scale up and display content of a target secondary container of the plurality of secondary containers;
generate a scaling factor u of the target secondary container;
adjust the area of the target secondary container u times, and correspondingly adjust the area of one or more other secondary containers of the plurality of secondary containers to keep the total width of the plurality of secondary containers unchanged; and
display the elements of the adjusted secondary containers on the screen of the terminal.

8. The device according to claim 7, wherein the instructions are further configured to cause the one or more processors to:
compare the width of the screen of the terminal with the width of the primary container, and choose the minimum value of the two;
multiply the minimum value with the preset scale factor k, and then divide the result of the multiplication calculation by the width of the target secondary containers, to obtain a first scaling factor u1; and divide a height value of the primary container by a height value of the target secondary container, to obtain a second scaling factor u2; and
determine the minimum value in the u1 and u2 as the scaling factor u.

9. A non-transitory computer readable medium with processor executable program code, when executed, the program code causing a processor to execute the following steps of:
acquiring source code of a webpage to be displayed;
parsing the source code to form tree-shaped nodes;
composing the tree-shaped nodes according to style specifications of the source code;
determining at least a primary container according to the composed tree-shaped nodes, wherein the determining a primary container according to the composed tree-shaped nodes comprises:
judging whether a parent node of the current node is the primary container;
upon judging that the parent node of the current node is the primary container, judging whether the width of the current node is greater than or equal to a first percentage of the width of a root node and greater than or equal to a second percentage of the width of the parent node of the current node;
upon judging that the width of the current node is greater than or equal to the first percentage of the width of the root node and greater than or equal to the second percentage of the width of the parent node of the current node, judging whether the height of the current node is a fixed value; and
upon judging that the height of the current node is not the fixed value, determining the current node as the primary container;
determining a plurality of secondary containers in the primary container, wherein each of the secondary containers contains some of elements of the webpage to be displayed;
determining an area of each of the secondary containers in the primary container and a threshold value associated with areas of the secondary containers;
adjusting the area of one or more of the secondary containers that is greater than the threshold value to be scaled up and the area of other one or more of the secondary containers to be scaled down; and
displaying the elements of the webpage to be displayed which are contained in the adjusted secondary containers on a screen of a terminal.

10. A webpage display method, the method comprising:
composing tree-shaped nodes according to style specifications of source code of a webpage to be displayed, wherein the tree-shaped nodes are formed after the source code is parsed;
determining at least a primary container and a plurality of secondary containers in the primary container according to the composed tree-shaped nodes, wherein each secondary container contains some elements in the webpage to be displayed, wherein the determining at least one secondary container contained in the primary container comprises:
judging whether a parent node of the current node is the primary container;
upon judging that the parent node of the current node is the primary container, judging whether the width of the current node belongs to a preset value range, wherein two endpoint values of the preset value range are respectively a product of the width of the parent node of the current node and a third percentage and a product of the width of the parent node of the current node and a fourth percentage, and the third percentage is smaller than the fourth percentage; and
upon judging that the width belongs to the preset value range, determining the current node as the secondary container;
determining an area of each of the secondary containers in the primary container and a threshold value associated with areas of the secondary containers;
adjusting the area of one or more of the secondary containers that is greater than the threshold value to be scaled up and the area of other one or more of the secondary containers to be scaled down; and
displaying the elements of the webpage to be displayed which are contained in the adjusted secondary containers on a screen of a terminal.

11. The method according to claim 10, wherein the determining a primary container according to the composed tree-shaped nodes comprises:
finding a node in the tree-shaped nodes of which parent node null and the height of the node is not a fixed value; and
determining the found node as the primary container.

12. The method according to claim 10, wherein the determining a primary container according to the composed tree-shaped nodes comprises:
judging whether a parent node of the current node is the primary container;
upon judging that the parent node of the current node is the primary container, judging whether the width of the current node is greater than or equal to a first percentage of the width of a root node and greater than or equal to a second percentage of the width of the parent node of the current node;
upon judging that the width of the current node is greater than or equal to the first percentage of the width of the root node and greater than or equal to the second percentage of the width of the parent node of the current node, judging whether the height of the current node is a fixed value; and
upon judging that the height of the current node is not the fixed value, determining the current node as the primary container.

13. The method according to claim 10, wherein the threshold value is an average value of the areas of the plurality of secondary containers, and the adjusting the areas of the secondary containers comprises:
- comparing the area of each of the plurality of secondary containers with the average value;
- with respect to the area of at least one of the plurality of secondary containers that is greater than the average value, scaling up the area of the at least one of the plurality of secondary containers according to a preset scale factor k, wherein k is greater than 1, and scaling down the area of other one or more of the plurality of secondary containers to keep the total width of the plurality of secondary containers unchanged.

14. The method according to claim 13, wherein k is determined by a frequency at which each of the plurality of secondary containers is browsed.

15. The method according to claim 13, wherein the determining the area of each of the secondary containers comprises one of the following steps:
- calculating a product of the width of the secondary container and the height of the secondary container, and acquiring the area of the secondary container;

or,
- respectively calculating the area of each type of webpage elements in the secondary container, and adding the areas of various types of webpage elements to calculate the area of the secondary container.

* * * * *